US007000632B2

(12) United States Patent
McIntire et al.

(10) Patent No.: US 7,000,632 B2
(45) Date of Patent: Feb. 21, 2006

(54) VALVE APPARATUS

(75) Inventors: William R. McIntire, Sugar Land, TX (US); Hau N. Pham, Houston, TX (US); Joseph M. Hubenschmidt, Sugar Land, TX (US); Mark E. Upton, Richmond, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 104 days.

(21) Appl. No.: 10/766,797

(22) Filed: Jan. 28, 2004

(65) Prior Publication Data

US 2004/0182448 A1 Sep. 23, 2004

Related U.S. Application Data

(62) Division of application No. 09/747,398, filed on Dec. 21, 2000, now Pat. No. 6,701,955.

(51) Int. Cl.
*F16K 15/06* (2006.01)

(52) U.S. Cl. .................................. 137/516.29; 137/902

(58) Field of Classification Search ................ 137/513, 137/513.5, 516.27, 516.29, 902; 251/332

See application file for complete search history.

(56) References Cited

U.S. PATENT DOCUMENTS

| | | | | | |
|---|---|---|---|---|---|
| 874,652 | A | * | 12/1907 | Bailey | 137/516.29 |
| 2,495,880 | A | * | 1/1950 | Volpin | 137/516.29 |
| 3,039,488 | A | * | 6/1962 | Bowerman | 137/516.29 |
| 3,057,372 | A | * | 10/1962 | Sutton et al. | 137/516.29 |
| 4,890,640 | A | * | 1/1990 | King, Sr. | 137/516.27 |
| 4,922,957 | A | * | 5/1990 | Johnson | 137/516.29 |
| 4,951,707 | A | * | 8/1990 | Johnson | 137/516.29 |

* cited by examiner

*Primary Examiner*—John Rivell
(74) *Attorney, Agent, or Firm*—Thomas O. Mitchell; Tim Curington; Robin Nava

(57) ABSTRACT

A valve apparatus that has a longitudinal axis therethrough comprises a valve seat member, a valve closure member, a fluid flow path, and a screening member. The valve seat member comprises a hollow bore and a first frustoconical contact surface. The valve closure member comprises a body and a second frustoconical contact surface that is adapted to seal against the first frustoconical contact surface. The valve closure member is movable along the longitudinal axis of the valve apparatus. The fluid flow path extends through the bore of the valve seat member and between the valve seat member and the valve closure member. This fluid flow path is closed when the second frustoconical contact surface is sealed against the first frustoconical contact surface. The screening member is attached to at least one of the valve closure member or the valve seat member, and screens particles from fluid passing through the fluid flow path when the valve closure member approaches the valve seat member.

3 Claims, 11 Drawing Sheets

Prior Art

VALVE APPARATUS

This is a division of application Ser. No. 09/747,398, filed Dec. 21, 2000, now U.S. Pat. No. 6,701,955.

BACKGROUND OF THE INVENTION

This invention relates generally to fluid delivery systems and more particularly to valve assemblies that must handle particulate-containing fluids.

It is common to pump fluids that contain particulates into oil and gas wells. For example, fracturing fluids typically contain proppant particles, such as sand or small beads, (sizes typically from U.S. Standard Sieve sizes 10 through 60). Reciprocating plunger pumps are frequently used to create the high-pressure fluid flow needed to inject fluids, such as fracturing fluids, into oil and gas formations. These pumps typically include valve assemblies that are biased toward the closed position. When the motion of the plunger creates a differential pressure across the valve, the differential pressure forces the valve open, allowing the fluid to flow through the valve. However, solid particles in the fluid can become trapped within the valve assembly upon valve closure, creating damage to valve assembly components and reducing the useful life of the valve assembly.

The valve assembly will typically contain an area where two metal surfaces contact each other when the valve is closed. The solid particles from the fluid can become trapped between the two metal contact surfaces in specific locations rather than evenly distributed across those surfaces, creating concentrated stress forces at these locations. These concentrated stress forces can lead to localized pitting. Once pitting has occurred, the solid particles tend to concentrate at the location of the pitting, which in turn accelerates the damage at these locations.

Valves used for slurry service typically have a resilient sealing insert around the outer perimeter of the valve closure member to provide effective valve sealing. Pressure applied to a closed valve forces the resilient sealing insert to become a hydraulic seal, extruded into the gap between the valve closure member and the valve seat member. For the insert to effect a hydraulic seal upon valve closure, the insert must protrude from the valve closure member toward the valve seat member when the valve is open. When the valve is nearly closed, the resilient sealing insert contacts the valve seat member. When the valve is closed, the resilient sealing insert is deformed against the seat member to form the hydraulic seal, and metal-to-metal contact occurs between the valve closure member and the valve seat member. Proppant trapped under the resilient sealing insert can become temporarily or permanently embedded in the resilient insert material, so that the insert can effect a hydraulic seal in the presence of proppant. In the presence of proppant, the metal surfaces of the valve closure member and valve seat member do not form a hydraulic seal.

The resilient sealing insert of current valves is on the outer perimeter of the valve closure member or valve seat member, so that applied pressure will deform the resilient sealing insert to seal between the valve closure member and the valve seat member. If the resilient sealing insert were on the inner perimeter of the valve closure member or valve seat member, then applied pressure would force the resilient sealing insert away from the contact area between the valve closure member and the valve seat member, and the valve would not seal.

The resilient sealing insert of current valves contacts the valve seat member before the valve closure member contacts the valve seat member. The gap between the sealing insert and the seat of an open valve is smaller than the gap between the valve closure member and the valve seat. When the valve is closing, the gap between the sealing insert and the valve seat member becomes too small to pass particles in the fluid, while the gap between the valve closure member and the valve seat member is still large enough to pass particles into the region between them. Thus a standard valve sealing insert can act as a forward screening element that concentrates proppant particles in the region between the valve closure member and the valve seat member. Such concentrations of proppant particles cause damage to the contacting surfaces of the valve closure member and the valve seat member.

If the pump is operated in such a way as to have significant valve lag, i.e. a discharge valve does not close until well after the plunger starts its suction stroke, there will be reverse flow through the valve before it closes. The standard sealing insert will screen out proppant particles from the reverse fluid flow, preventing the particles from entering the region between the valve closure member and the valve seat member. However, the volume of fluid which flows through current valves during the short time interval between the onset of such reverse particle screening and the closure of the valve typically is insufficient to displace the proppant-laden fluid from the valve before closure. Particles are still trapped between the valve closure member and the valve seat member.

Conventional liquid end valve assemblies may also experience failures due to foreign objects becoming lodged within the valve assembly (e.g., bolts or gravel can accidentally enter the fluid flow path). These foreign objects can become wedged between the contact surfaces of the valve, and thus prevent the valve from closing.

There is a need for improved valve assemblies that reduce the incidence of damage caused by particulates or foreign objects in well treating fluids.

SUMMARY OF THE INVENTION

The present invention relates to valve assemblies that can reduce the problem of solid particle damage within the valve, and can also help reduce or avoid the problems associated with foreign objects becoming lodged within the valve. This invention is well suited for use with pumps that inject particle-laden fluid during the treatment of oil and gas wells, but could be used for other purposes as well.

One aspect of the invention is a valve apparatus that can screen particles from fluid flowing forward through the valve. This valve apparatus has a longitudinal axis therethrough and comprises a valve seat member, a valve closure member, a fluid flow path, and a forward screening member. The valve seat member is usually stationary, and comprises a hollow bore and a first frustoconical contact surface. The valve closure member comprises a body and a second frustoconical contact surface that is adapted to seal against the first frustoconical contact surface. The valve closure member is movable along the longitudinal axis of the valve apparatus (i.e., toward and away from the valve seat member). The fluid flow path extends through the bore of the valve seat member and between the valve seat member and the valve closure member. This fluid flow path is closed when the second frustoconical contact surface is sealed against the first frustoconical contact surface. The forward screening member is attached to at least one of the valve closure member or the valve seat member. This forward screening member screens particles from fluid passing through the fluid flow path in a forward direction when the valve closure member approaches the valve seat member. This results in preventing the screened particles from entering the region between the valve closure member and the valve seat member. To perform such forward flow screening, the forward screening member may be located around the inner perimeter of the region between the valve closure member and the valve seat member.

In one embodiment the forward screening member comprises a cylindrical plug that is near the inner perimeter of the second frustoconical contact surface and can extend into the bore of the valve seat member. The valve seat member comprises a cylindrical inner wall, and a screening gap exists between the cylindrical inner wall and the cylindrical plug when the valve closure member is near to the valve seat member. This screening gap is small enough to prevent passage of particles of a selected size from passing through the fluid flow path. The particles to be screened out will generally consist of proppant particles having a generalized average diameter of about 0.01–0.10 inches and a likely average diameter of 0.02–0.07 inches. The cylindrical plug can further comprise a first cylindrical section having a first diameter and a second cylindrical section having a second diameter that is greater than the first diameter. The screening gap between the second section and the cylindrical inner wall is small enough to prevent particles of a selected size from passing through the fluid flow path.

In another embodiment at least one of the valve closure member and the valve seat member comprises a resilient insert near the inner perimeter of a frustoconical contact surface. The resilient insert can be attached to the valve closure member and extend further toward the first frustoconical contact surface than the second frustoconical contact surface does.

In yet another embodiment the forward screening member comprises a screening insert that is near the inner perimeter of either the first or second frustoconical contact surface, and a screening gap exists between the forward screening insert and the opposing frustoconical contact surface when the valve closure member is near to the valve seat member. The screening gap is small enough to prevent particles of a selected size from passing through the valve assembly. The forward screening insert can be a resilient screening insert. The forward screening member can comprise a plurality of forward screening inserts near the inner perimeter of either the first or second or both frustoconical contact surfaces. The resilient forward screening insert can be attached to the valve seat member and contact the second frustoconical contact surface when the valve closure member approaches the valve seat member. The forward screening insert can also be attached to the valve closure member. The forward screening insert can extend into the bore of the valve seat member. When there are more than one forward screening inserts at least one of the forward screening inserts can extend into the bore of the valve seat member.

Another aspect of the invention is a valve apparatus that can screen particles from fluid flowing in reverse through the valve. This reverse flow occurs when there is valve lag, and the discharge valve does not close before the plunger starts its suction stroke. In contrast to the small amount of particle screening typically done by a standard resilient sealing insert on the outer perimeter of the valve assembly during the short time interval between the onset of reverse screening due to valve lag and the closure of the valve in current valves, the reverse screening apparatus of the present invention can prolong that time interval until a sufficient volume of filtered fluid flows into the region between the valve closure member and the valve seat member to displace proppant laden fluid from that region. Although there can be some reverse flow and reverse particle screening with current resilient sealing insert designs, the volume of filtered fluid can not be sufficient to displace the particle laden fluid from the region between the valve closure member contact surface and the valve seat member contact surface.

One aspect of the present invention positions the valve through mechanical means such as a cam or hydraulic positioner. The optimal valve positioning for pumping particle-laden fluids includes valve lag and reverse screening. The positioning mechanism delays the valve closure member's descent temporarily within a range of reverse screening heights above the valve seat such that the resilient sealing insert screens out proppant particles from the fluid in reverse flow into the valve, and the frustoconical contact surfaces are held far enough apart for proppant-laden fluid to pass between them. The proppant particles are concentrated outside the valve where they cannot interfere with valve closure or damage the valve contact surfaces. Then after sufficient reverse fluid flow occurs to displace the proppant-laden slurry from the region between the valve closure member and the valve seat member with fluid from which the proppant had been screened, the valve closure member is lowered fully to close the valve. The valve closure member and the valve seat member contact each other with no proppant particles in between them to be crushed and damage the contacting surfaces of the valve closure member and the valve seat member.

As an alternative to mechanical valve positioning, another aspect of the present invention is a valve apparatus which uses the resilient sealing insert as a spring to effect the delay of the valve closure member descent within a range of screening heights above the valve seat member and allow reverse screening to clear proppant-laden fluid from the region between the valve closure member and the valve seat member. This apparatus has a longitudinal axis therethrough and comprises a valve seat member, a valve closure member, a fluid flow path, and a reverse screening member. The valve seat member is usually stationary, and comprises a hollow bore and a first frustoconical contact surface. The valve closure member comprises a body and a second frustoconical contact surface that is adapted to seal against the first frustoconical contact surface. The valve closure member is movable along the longitudinal axis of the valve apparatus (i.e., toward and away from the valve seat member). The fluid flow path extends through the bore of the valve seat member and between the valve seat member and the valve closure member. This fluid flow path is closed when the second frustoconical contact surface is in contact with the first frustoconical contact surface. The reverse screening member is attached to at least one of the valve closure member or the valve seat member. This reverse screening member screens particles from fluid passing through the fluid flow path in a reverse direction when the valve closure member approaches the valve seat member. The fluid without the particles flows into the region between the valve closure member and the valve seat member, and displaces particle-laden fluid from that region before the valve closes.

In one embodiment of the invention at least one of the valve closure member and the valve seat member comprises a resilient insert near the outer perimeter of a frustoconical contact surface. The resilient insert can be attached to the valve closure member and extend further toward the first frustoconical contact surface than the second frustoconical contact surface does. A valve exit gap exists between the resilient insert and the first frustoconical contact surface that varies in size as the valve closure member moves relative to the valve seat member. When reverse flow occurs through the valve, this valve exit gap becomes the entrance for the reverse flowing fluid entering the valve assembly.

The reverse screening member can comprise a screening insert that is near the outer perimeter of either the first or second frustoconical contact surface. A screening gap can exist between the reverse screening insert and the opposing frustoconical contact surface when the valve closure member approaches the valve seat member. The screening gap can be small enough to prevent particles of a selected size from passing through the valve assembly, while the gap between the frustoconical contact surfaces is still large enough to allow passage of particle-laden fluid. The reverse screening member can be a resilient screening insert. The reverse screening member can comprise a plurality of screening inserts near the outer perimeter of either the first or second or both frustoconical contact surfaces. The reverse screening member can be attached to the valve seat member and contact the second frustoconical contact surface when the valve closure member approaches the valve seat member. The reverse screening member can also be attached to the valve closure member and contact the first frustoconical contact surface when the valve closure member approaches the valve seat member.

The valve closure member has an outer perimeter and the resilient insert can be located at said outer perimeter. This will create a valve exit gap between the resilient insert and the first frustoconical surface, the size of the valve exit gap varying with the radial distance from the outer perimeter.

A screening gap can exist between the resilient screening insert and the first frustoconical contact surface when the valve closure member approaches the valve seat member. The screening gap can be small enough to prevent particles of a selected size from passing through the screening gap, while the gap between the frustoconical contact surfaces is still large enough to allow particle-laden fluid to pass between them. Proppant particles can be trapped between the reverse screening member and the first frustoconical contact surface. These particles can hold the valve closure member up above the valve seat member, until sufficient differential pressure exists to deform the resilient screening insert and effect a hydraulic seal. When the plunger moves to create reverse flow through a valve, a differential pressure is created across the valve. Fluid from which the proppant particles have been screened can pass into the valve, and can displace proppant-laden fluid from the region between the frustoconical surfaces. The proppant particles trapped between the reverse screening insert and the valve seat member can hold the valve open to provide a gap between the valve closure member contact surface and the valve seat member contact surface sufficiently wide to allow the proppant laden fluid in the gap to move, carrying the proppant particles out of the valve. When the plunger velocity increases, the flow velocity across the valve and the differential pressure across the valve increase. Downward force on the valve closure member due to the differential pressure can deform the resilient reverse screening insert and close the valve.

In another embodiment of the present invention, the resilient reverse screening insert can comprise at least one protrusion on its surface that contacts the valve seat member when the valve closure member approaches the valve seat member. The resilient insert can further comprise a non-resilient element having at least one protrusion on its surface that contacts the valve seat member when the valve closure member approaches the valve seat member. The protrusions can temporarily delay the downward motion of the valve closure member within a range of screening heights above the valve seat member where the screening gap between the reverse screening insert and the valve seat member is small enough to prohibit passage of particles of a selected size and where the gap between the frustoconical contact surfaces is still large enough to allow passage of particle-laden fluid. The screening gap can be maintained until sufficient differential pressure exists to deform the insert protrusions and close the valve. The screening gap can also be created by at least one protrusion from the first frustoconical contact surface in the area contacted by the resilient insert. The screening gap can be created by at least one protrusion on each of the resilient insert and the first frustoconical contact surface.

The protrusions can have the form of small bumps. The shape of the protrusions is not important. The protrusions simply hold the resilient insert up enough to allow fluid without particles to pass between the insert and the opposing frustoconical surface. The protrusions can have many other forms such as a series of small ridges, a knurled pattern or a wavy surface. A combination of protrusions on the insert and on the opposing frustoconical contact surface can also be provided.

The valve closure member can further comprise a bypass fluid flow path between the resilient insert and the body of the valve closure member. The bypass fluid flow path can have a size small enough to prevent particles of a selected size from passing therethrough, while the gap between the frustoconical contact surfaces is still large enough to allow passage of particle-laden fluid. The bypass fluid flow path can be created by at least one protrusion on the valve closure member body that spaces the resilient insert away from the rest of the valve closure member. The bypass fluid flow path can also be created by at least one protrusion on the resilient insert that spaces the valve closure member body away from the rest of the resilient insert. The bypass fluid flow path can be created by at least one protrusion on each of the resilient insert and the valve closure member body. The bypass flow path can be maintained until sufficient differential pressure exists to deform the insert and close the path.

An additional aspect of the present invention is a valve apparatus that can screen foreign objects (such as bolts or rocks) from the fluid passing into the valve assembly. By screening the foreign objects from the fluid, they are prevented from becoming lodged between the contact surfaces and preventing the valve from closing. This can result in fewer unplanned shutdowns for valve maintenance and can improve valve efficiency.

This embodiment comprises a valve apparatus that has a longitudinal axis therethrough and comprises a valve seat member, a valve closure member, a fluid flow path, and a screening member. The valve seat member is usually stationary, and comprises a hollow bore and a first frustoconical contact surface. The valve closure member comprises a body and a second frustoconical contact surface that is adapted to seal against the first frustoconical contact surface. The valve closure member is movable along the longitudinal axis of the valve apparatus (i.e., toward and away from the valve seat member). The fluid flow path extends through the bore of the valve seat member and between the valve seat member and the valve closure member. This fluid flow path is closed when the second frustoconical contact surface is sealed against the first frustoconical contact surface. The screening member is attached to at least one of the valve closure member or the valve seat member. This screening member screens foreign objects from fluid passing through the fluid flow path in a forward direction when the valve closure member approaches the valve seat member.

In one embodiment the screening member can comprise a cylindrical plug that is near the inner perimeter of the second frustoconical contact surface and that extends into the bore of the valve seat member. In this embodiment of the invention the valve seat member comprises a cylindrical inner wall, and a plug gap exists between the cylindrical inner wall and the cylindrical plug. This plug gap is small enough to prevent passage of foreign objects, such as bolts or gravel. A valve exit gap will exist between the resilient sealing insert and the first frustoconical contact surface that varies in size as the valve closure member moves relative to the valve seat member, and it is preferred that the maximum size of the valve exit gap is at least as large as the plug gap. This will allow any material that enters through the plug gap to exit through the valve exit gap. The maximum size of the valve exit gap will depend on the amount of valve lift. Valve lift can be increased if the fluid forces on the screening member are greater than the fluid forces normally applied to a valve closure member without the screening member.

Optionally, the cylindrical plug can extend through the bore of the valve seat member. It is also possible for the cylindrical plug to further comprise a plurality of radial protrusions that align the cylindrical plug relative to the cylindrical inner wall of the valve seat member. It is especially preferred that the radial protrusions be sized and spaced to substantially equalize the plug gap around the circumference of the cylindrical plug. These radial protrusions optionally can extend into the bore of the valve seat member.

BRIEF DESCRIPTION OF THE DRAWINGS

The advantages and features of the present invention can be more fully understood by referring to the following detailed description and by reference to the attached drawings, in which.

DESCRIPTION OF ILLUSTRATIVE EMBODIMENTS

The present invention is illustrated hereby with valve assemblies that can be used in a plunger-type pump. However, the valve assembly of the present invention can also be used in other applications.

Figure 1:
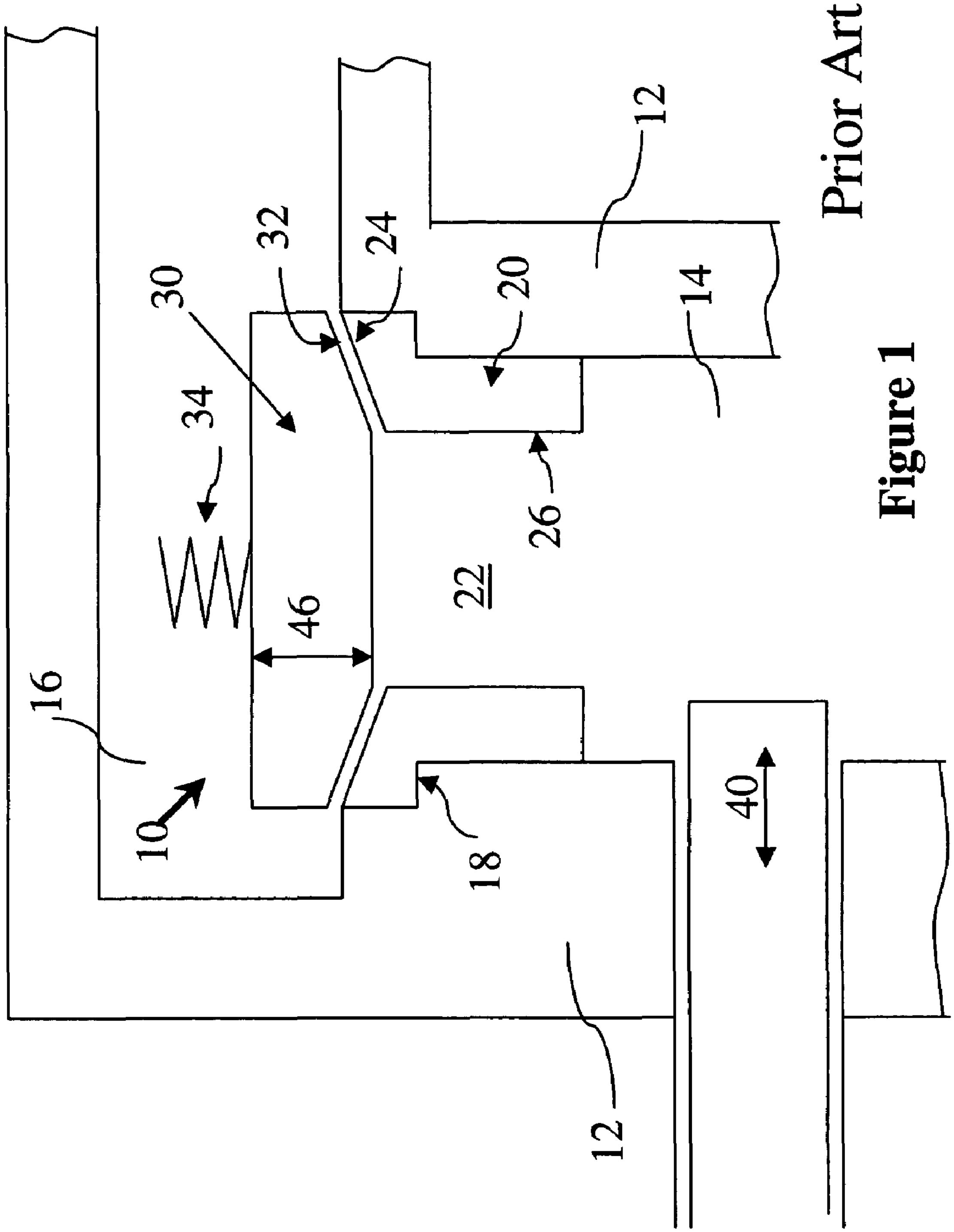
FIG. 1 is a simplified cross sectional view of a typical plunger type pump.

Referring to FIG. 1, a high pressure pump such as a plunger pump comprises a valve apparatus, shown generally as 10. The valve apparatus 10 fits in the pump body 12, which forms an intake or pressure chamber 14 and a discharge chamber 16. An annular wall 18 in the pump body 12 provides a means for receiving a valve seat member 20. The valve seat member 20 comprises a hollow bore 22 that provides a fluid flow path between the intake chamber 14 and the discharge chamber 16. The valve seat member 20 has a frustoconical contact surface 24 and a generally cylindrical inner wall 26 that defines the valve seat member bore 22, and which can act as a guide surface. A valve closure member 30 has a frustoconical contact surface 32 that is complimentary to the frustoconical contact surface 24 on the valve seat member 20. A compression spring 34 urges the valve closure member 30 toward the valve seat member 20 to create a contacting relationship between frustoconical contact surface 24 and frustoconical contact surface 32. Shown in FIG. 1 is a discharge valve assembly. A similar suction valve assembly (not shown) could also be attached to the intake chamber 14. The present invention will be illustrated and described using a discharge valve but will work in an equivalent manner on a suction valve. In this patent application terms such as "above", "below", "upward" and "downward" will be used relative to the frame of reference shown in the drawings. It should be understood that these terms are intended to be relative, and the valve assembly could be oriented in any direction.

In operation and as known in the art, the discharge stroke of the plunger 40 results in an elevated pressure within the intake chamber 14. The elevated pressure within the intake chamber 14 causes the valve closure member 30 to move away from the valve seat member 20 as shown by the arrow 46. This allows fluid to be displaced from the intake chamber 14, through the valve seat member bore 22, and into the discharge chamber 16. Fluid flow from the intake chamber 14 into the discharge chamber 16 is referred to as forward flow through the valve apparatus 10. When the valve closure member 30 is raised by fluid forces arising from the forward motion of the plunger 40, the compression spring 34 is compressed and exerts an increasing force downward on the valve closure member 30. When the plunger 40 slows towards the end of its discharge stroke, the fluid forces upward on the valve closure member 30 decrease and become less than the spring force downward on the valve closure member 30. The valve closure member 30 is pushed downwards towards its closed position against the valve seat member 20. The compression spring 34 moves the valve closure member 30 towards the valve seat member 20 to reestablish the contacting relationship between frustoconical contact surface 24 and frustoconical contact surface 32. Further movement of the plunger 40 in a suction stroke will create a suction within the intake chamber 14 and the aforementioned suction valve assembly (not shown) will work in a similar manner, allowing fluid to be drawn into the intake chamber 14. At the start of the plunger 40 suction stroke, a small amount of fluid flows from the discharge chamber 16 into the suction chamber 14. This is referred to as reverse flow through the valve apparatus 10. This reverse flow will continue until the combined forces of the suction pressure within the intake chamber 14 and the compression spring 34 are sufficient to form a positive seal between the valve closure member 30 and the valve seat member 20.

Forward flow and reverse flow through the valve apparatus 10 have separate working mechanisms and are not equivalent. Forward flow results when the pressure in the intake chamber 14 is sufficiently greater than the pressure in the discharge chamber 16 that it overcomes the resistance force applied by the compression spring 34. Forward flow involves hydrostatic pressure overcoming a resisting force. Reverse flow also needs a pressure differential across the valve assembly 10. But rather than the pressure differential overcoming an opposing force, reverse flow involves the time lag inherent in the valve closure member 30 closing. Once the pressure has equalized between the intake chamber 14 and the discharge chamber 16, the forward flow of fluid will stop. At that time the valve closure member 30 will still be in the process of approaching the valve seat member 20, moving in response to the force from the compression spring 34. The time period between the cessation of the forward fluid flow and the closing of the valve closure member 30 upon the valve seat member 20 is commonly referred to as valve lag. During this valve lag time period the start of the plunger suction stroke has reduced the pressure within the intake chamber 14 to less than the discharge chamber 16. This results in a reverse fluid flow until there is an adequate fluid seal between the valve closure member 30 and the valve seat member 20. If an adequate fluid seal between the valve closure member 30 and the valve seat member 20 is not achieved, there will be reverse fluid flow throughout the entire suction stroke.

Figure 2:
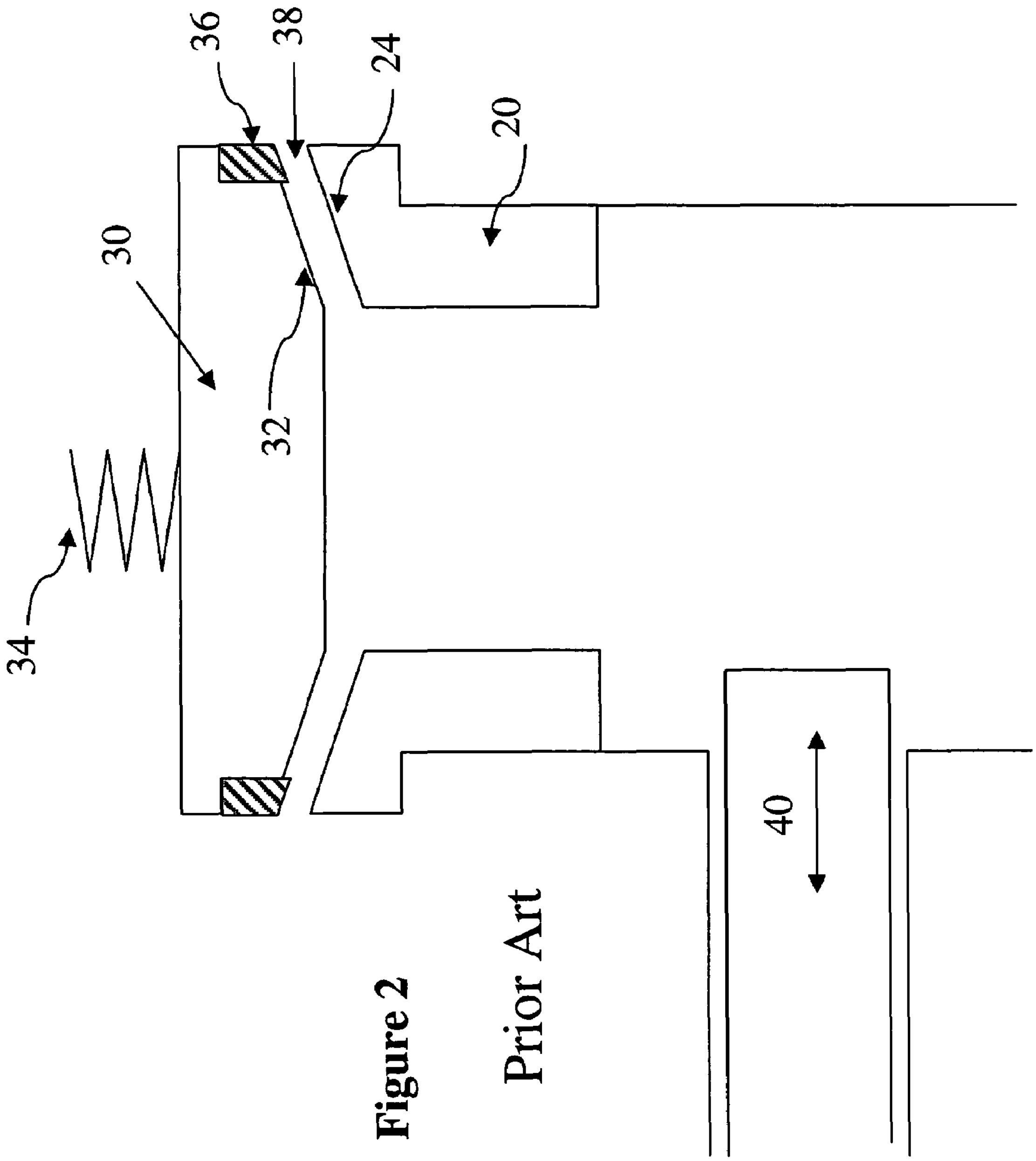
FIG. 2 is a simplified cross sectional view of a valve assembly portion of a plunger type pump, showing the typical location of a resilient sealing insert.

FIG. 2 shows a cross section of a portion of a valve assembly. A resilient sealing insert 36 is attached to the valve closure member 30 at its outer perimeter that acts to help effectuate a seal between frustoconical contact surface 24 and frustoconical contact surface 32. The distance between the resilient insert 36 and the opposing frustoconical contact surface creates a valve exit gap 38. The resilient insert also acts to dampen the stress forces imposed on the valve seat member 20 and the valve closure member 30 upon valve closure. For the resilient sealing insert 36 to be effective, the valve exit gap 38 between the resilient sealing insert 36 and the valve seat contact surface 24 must be smaller than the gap between the valve closure member contact surface 32 and the valve seat contact surface 24, when the valve is open. Although the resilient insert is attached to the valve closure member 30 in FIG. 2, it could instead be attached to the valve seat member 20.

Figure 3:
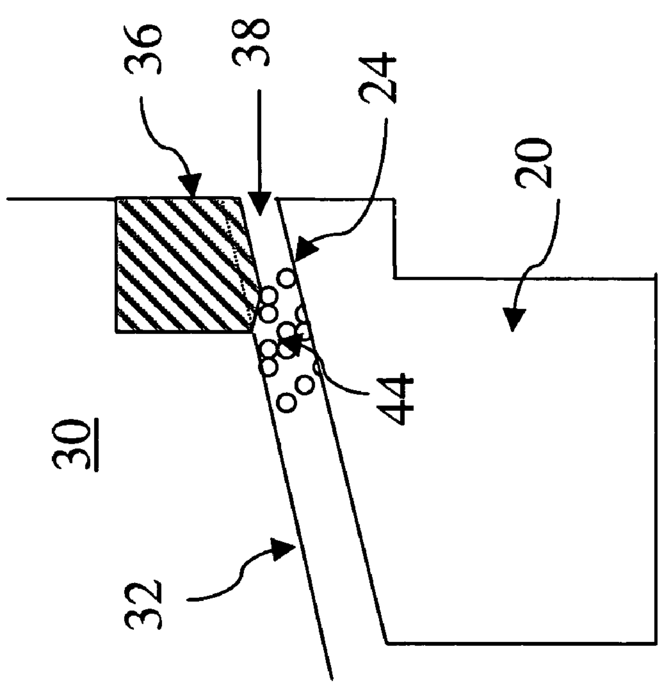
FIG. 3 illustrates the problem of particle buildup within the valve assembly.

FIG. 3 illustrates a common problem that occurs within pump assemblies that are used to pump solid laden fluids or slurries. Only the right hand side of the valve apparatus cross section is shown. As the valve closure member 30 approaches the valve seat member 20, the resilient insert 36 approaches the opposing frustoconical contact surface 24 and the valve exit gap 38 decreases. When the valve exit gap 38 reaches a certain point (for example, about 1.0–2.5 times the average solid particle diameter), the valve exit gap 38 will act to screen out the solid particles while still allowing fluid flow to pass. This forward screening effect will result in an accumulation of solid particles 44 between the valve seat member 20 and the valve closure member 30. As the valve closure member 30 closes against the valve seat member 20, the accumulation of solid particles 44 imposes localized forces onto the valve assembly. These localized forces can result in damage to the valve seat member 20, the valve closure member 30 or the resilient insert 36, such as pitting on one or more of the frustoconical contacting surfaces. In addition the crushing of individual proppant particles results in Hertzian contact stresses and damage to the frustoconical contact surfaces.

FIGS. 4–8 illustrate an embodiment of the present invention to screen particles by utilizing the working mechanism of fluid flowing in the forward direction. In these figures, only the right hand side of the valve apparatus cross sections are shown.

Figure 4:
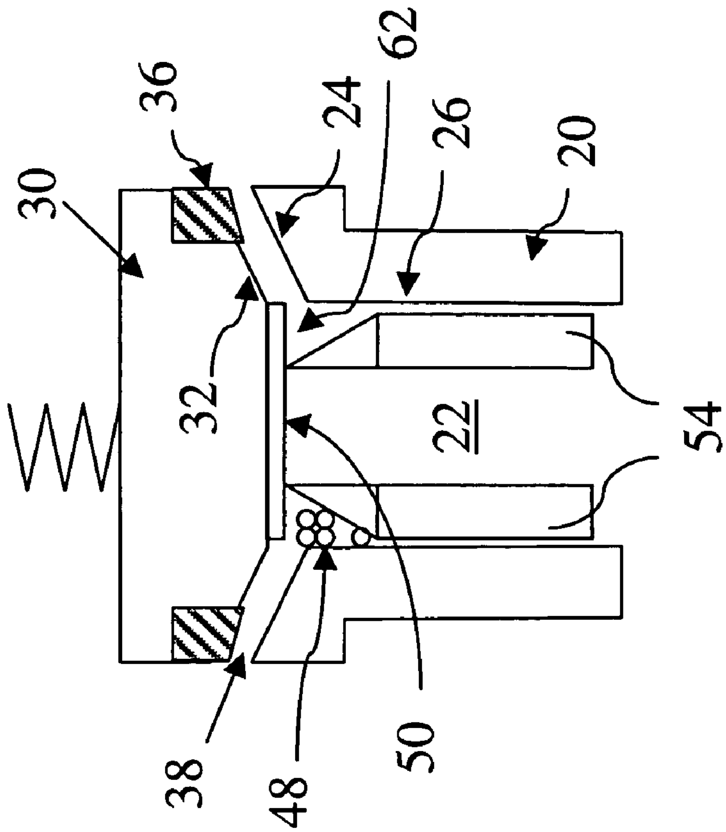
FIGS. 4–8 illustrate embodiments of the working mechanism of the present invention to screen particles from fluid flowing in the forward direction.

Referring to FIG. 4, there is shown an embodiment of a valve apparatus in accordance with the present invention. The valve closure member 30 has a cylindrical plug 50 that projects into the valve seat member bore 22 when the valve closure member 30 is near the valve seat member 20. Near the end of each discharge stroke a screening gap 62 is created between the bottom of the cylindrical plug 50 and the cylindrical inner wall 26 of the valve seat member 20. The cylindrical plug 50 is long enough to enter the valve seat member bore 22 and create the screening gap 62 before the valve exit gap 38 becomes too narrow to allow the particles to pass. The screening gap 62 is small enough to prevent particles of a selected size from passing. The particles to be screened out will consist of proppant particles having a generalized average diameter of about 0.01–0.10 inches and a likely average diameter of 0.02–0.07 inches. Therefore the final amount of fluid passing in a forward direction between the valve closure member 30 and the valve seat member 20 prior to the closure of the valve will be fluid that has had the particles screened out. The particle-free fluid will displace the particle-laden fluid that is located between the valve closure member 30 and the valve seat member 20, before the valve exit gap 38 becomes too small to allow the particles to pass. This will reduce the quantity of particles that are present between the valve closure member 30 and the valve seat member 20 upon valve closure and reduce the damage to the resilient insert 36 and the frustoconical contacting surfaces. This forward screening action will concentrate the particle buildup 48 in locations that are not between the valve seat member 20 and the valve closure member 30. Radial protrusions 54 can extend from the cylindrical plug 50 and can be used to align the cylindrical plug 50 relative to the valve seat member wall 26 to substantially equalize the screening gap 62 around the circumference of the cylindrical plug 50. A substantially equalized screening gap 62 would preferably have a <150% variance in size from the narrowest gap to the largest gap, more preferably <75% variance and most preferably <20% variance. The radial protrusions 54 can optionally extend below the cylindrical plug 50 into the valve seat member bore 22 and can extend through the valve seat member bore 22.

Figure 5:
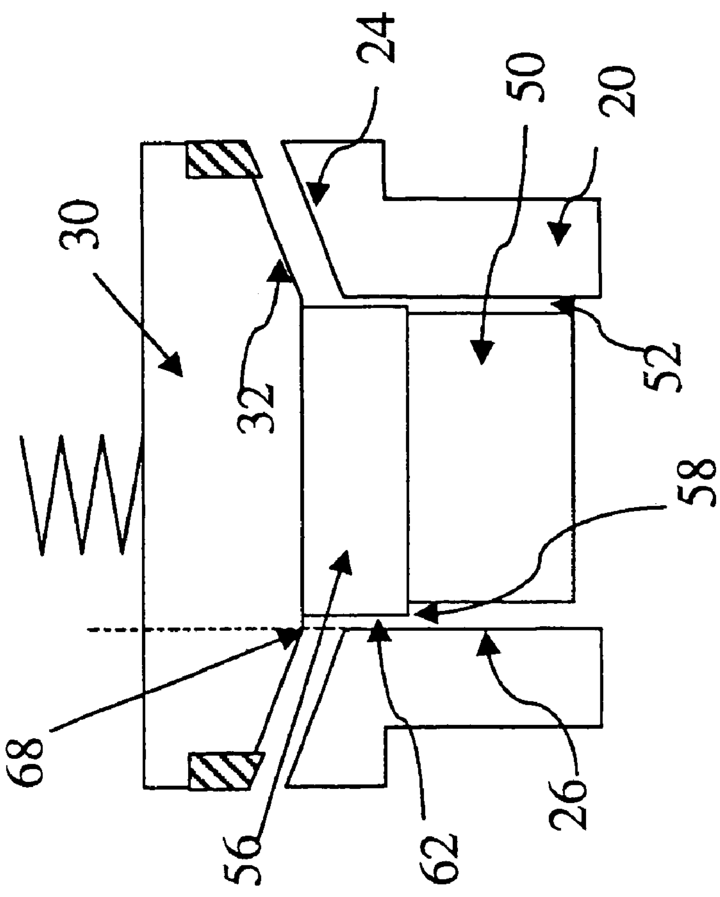

FIG. 5 depicts an embodiment of the present invention where the cylindrical plug 50 can comprise multiple sections of differing diameters. In this illustration, the cylindrical plug 50 comprises a second section 56 having a greater diameter than the rest of the cylindrical plug 50. The screening gap 62 between the second section 56 and the cylindrical wall 26 is smaller than the plug gap 52 between the rest of the cylindrical plug 50 and the cylindrical wall 26. When the valve closure member 30 approaches the valve seat member 20, this screening gap 62 is small enough to prevent particles of a selected size from passing through the screening gap 62 and therefore into the fluid flow path between the valve seat member 20 and the valve closure member 30. In a preferred embodiment, the screening gap 62 is between about 0.02–0.06 inches, which is also the average diameter of the proppant particles to be screened out. Having the cylindrical plug 56 inserted into the valve seat member bore 22 will give the valve closure member 30 more lifting force early in the discharge stroke of the plunger 40. The elevated pressure within the intake chamber 14 is applied to the cross-sectional area of the cylindrical plug 56 and will tend to launch the valve closure member 30 upwards. The fluid forces on the valve are large due to the fluid passing through the narrow screening gap 62, until the screening plug 56 has risen clear of the valve seat bore 22. These fluid forces are significantly greater than the fluid forces on a typical valve without the screening plug 56, because the fluid is forced through the narrow screening gap even after the valve has risen to positions where the valve exit gap 38 is much larger than the screening gap 62. This results in increased valve lift and decreased opportunity to trap foreign objects between valve closure member 30 and valve seat member 20.

Such increased lift can be obtained with a cylindrical plug 56 inserted into the valve seat member bore 22, even if the screening gap 62 is increased in size and does not screen proppant particles. A plug which extends into the valve seat member bore when the valve is closed can be used to increase valve lift and ensure some amount of valve lag and reverse fluid flow through the valve prior to closing.

Although FIG. 5 illustrates the principle of the forward screening gap using a cylindrical screening plug 56, the most important aspect of the plug geometry is the plug's bottom extremity 58 that defines the entrance to the region between the plug 56 and the valve seat cylindrical wall 26. The plug preferably is circular at its base to match the cylindrical symmetry of the valve seat member bore. Point 68 defines the edge of contact between contact surfaces 24 and 32. The shape of the plug between point 58 and point 68 is not important. The contribution of fluid friction in the gap to the fluid forces is insignificant compared with the pressure drop required to accelerate fluid into the gap. Particle screening occurs at the entrance to the gap and not within the gap. Although a cylindrical geometry may be preferred for manufacturing purposes, other plug shapes connecting points 58 and 68 can be used. In many figures we refer to cylindrical plug geometries to illustrate the screening principles. Other plug shapes can be employed to provide the screening effects.

Figure 6:
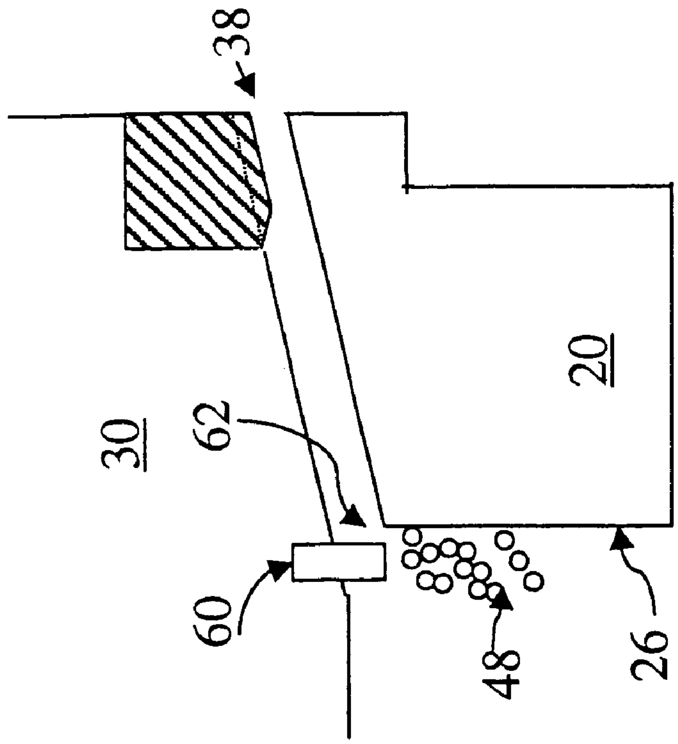
Figure 8:
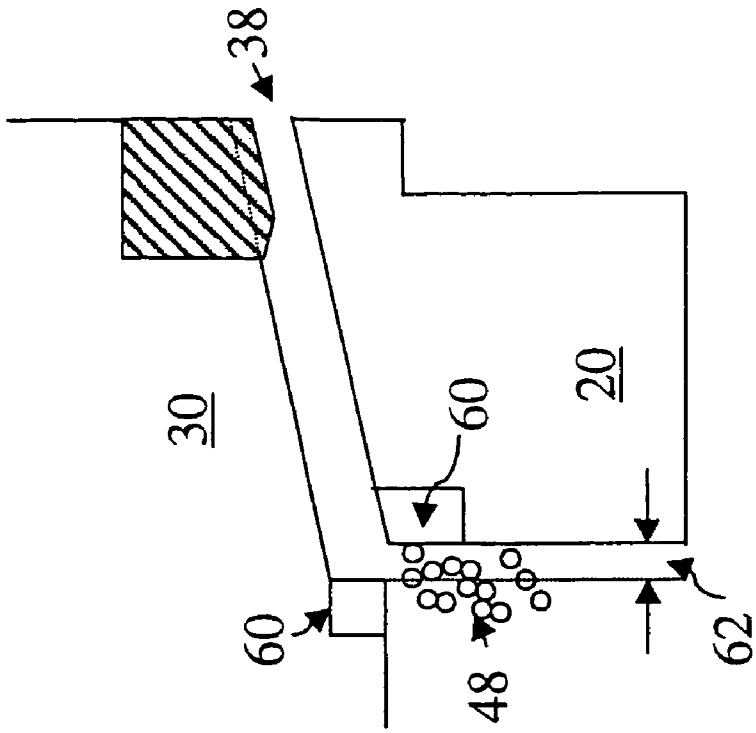
Figure 7:
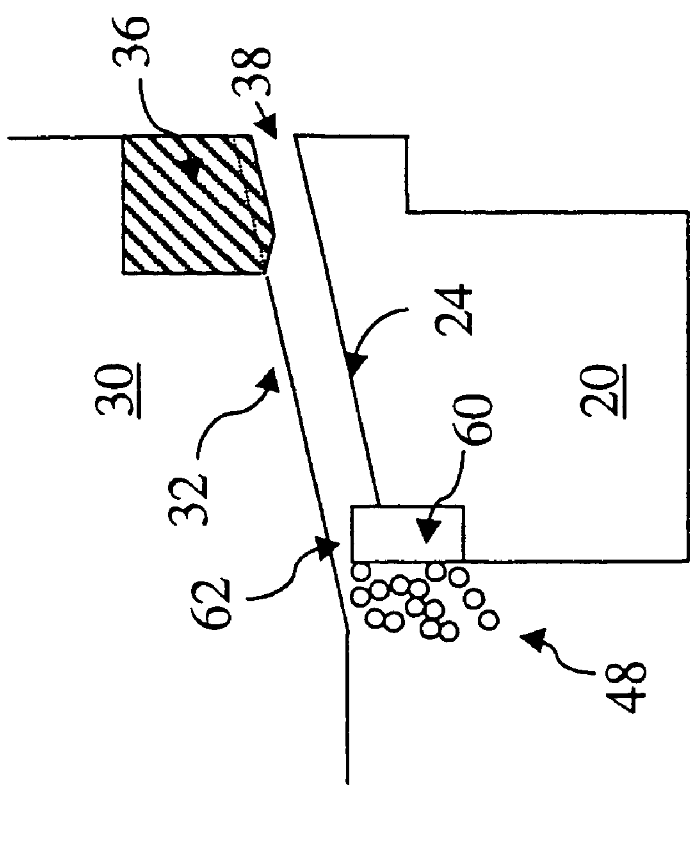

FIGS. 6, 7, and 8 show alternative embodiments of the present invention in which the valve closure member 30 and the valve seat member 20 comprise at least one forward screening insert 60, for instance made of a resilient material. When the valve closure member 30 approaches the valve seat member 20, a forward screening gap 62 is created that is small enough to prevent particles of a selected size from passing. This forward screening action will concentrate the particle buildup 48 in locations that are not between the valve seat member 20 and the valve closure member 30. The forward screening gap 62 is created before the valve exit gap 38 becomes too narrow to allow the particles to pass.

In FIG. 6 a forward screening gap 62 is created between the forward screening insert 60 and the valve seat member wall 26 when the valve closure member 30 approaches the valve seat member 20. When the valve is closed, the forward screening insert 60 shown in FIG. 6 extends into the bore of the valve seat member 20 but does not contact it, and therefore does not have to be resilient but could be a protruding portion of the valve closure member 30.

In FIG. 7 a forward screening gap 62 is created between a forward screening insert 60 and the opposing frustoconical contact surface 32 when the valve closure member 30 approaches the valve seat member 20 that is small enough to prevent particles of a selected size from passing, while the valve exit gap 38 between the resilient insert 36 and the first frustoconical contact surface 24 is still large enough to allow passage of particle-laden fluid. This forward screening action will concentrate the particle buildup 48 in locations that are not between the valve seat member 20 and the valve closure member 30. The forward screening insert shown in FIG. 7 will contact the valve closure member 30. This insert is made of a resilient material to allow the valve to close and then return to its original shape during the next cycle of valve lift.

FIG. 8 illustrates a combination of forward screening inserts 60 on the valve closure member 30 and the valve seat member 20 which act in concert to create the forward screening gap 62 when the valve closure member 30 approaches the valve seat member 20, and before the valve exit gap 38 becomes too small to allow the particles to pass. In the illustrated embodiment, the forward screening insert attached to the valve closure member extends into the bore of the valve seat member when the valve is closed.

There are many other possible configurations of a forward screening insert other than those depicted here, including for instance combination of forward screening inserts as described above. Other configurations can include variations in the size and location of the forward screening insert. In a preferred embodiment, the screening gap is about the same size as the particles to screen out, so typically between about 0.02–0.06 inches for proppant-containing slurries. Screening gaps significantly smaller than the particles sizes significantly increase valve alignment difficulties while screening gaps more than twice as large as the particles sizes are less effective. Although some figures illustrate the screening principle with cylindrical plugs, other plug shapes can be used to provide the screening effects.

Figure 19:
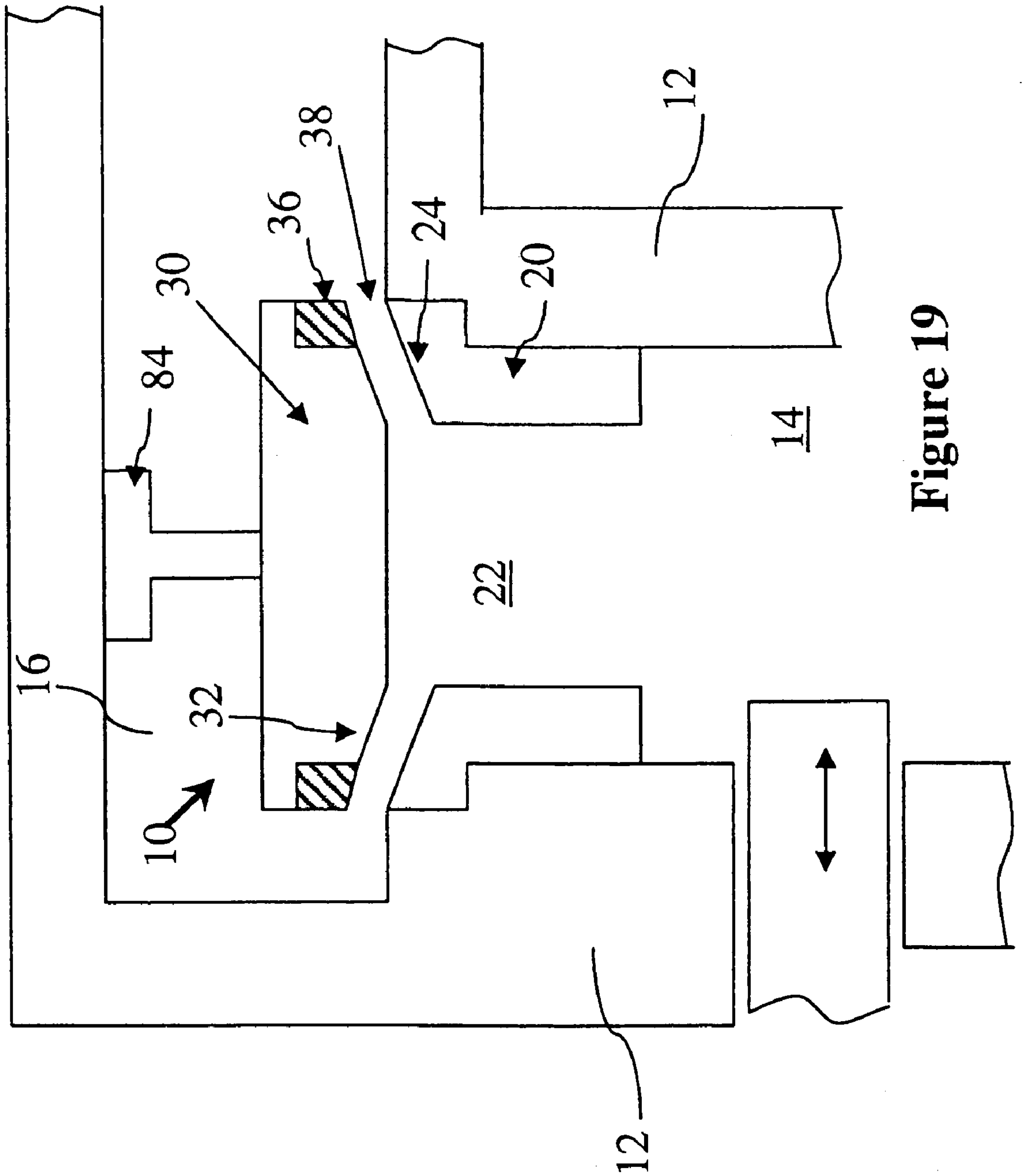
FIG. 19 illustrates an embodiment of the working mechanism of the present invention using a valve positioning mechanism to control particle screening.

FIG. 19 illustrates an embodiment of the present invention to screen particles from the particle-laden fluid or slurry in reverse flow through the valve, using a valve positioning mechanism 84 to control the descent of the valve closure member 30 toward the valve seat member 20 when the plunger begins its suction stroke. As in the embodiment illustrated FIG. 1, FIG. 19 shows a plunger pump with a valve apparatus fitted in the pump body 12, forming an intake or pressure chamber 14 and a discharge chamber 16. The valve exit gap 38 for forward flow becomes the screening gap at the entrance of the valve apparatus for reverse flow. A standard resilient insert 36 can serve as the reverse screening member. The valve positioning mechanism moves the valve closure member 30 relative to the valve seat member 20. Instead of moving the valve closure member 30 to contact the valve seat member 20 at the end of the plunger discharge stroke, the positioning mechanism 84 delays the valve closure and thus maintains a screening gap 38 between the resilient sealing insert 36 and the valve seat member contact surface 24 during the first portion of the plunger suction stroke. Particles in the fluid entering the valve apparatus in reverse flow during that time are screened out of the fluid. The particles are unable to pass through the screening gap 38. After sufficient screened fluid flows through the valve apparatus to displace particle-laden fluid from the region between the frustoconical surfaces 32 and 24, the valve positioning mechanism 84 moves the valve closure member 30 into contact with the valve seat member 24, distorting the resilient sealing insert 36 until the frustoconical contact surfaces 32 and 24 come into contact. The particles to be screened out will consist of proppant particles having a generalized average diameter of about 0.01–0.10 inches and a likely average diameter of 0.02–0.07 inches. The screening gap 38 dimension can be from about 1.0 times the average particle diameter to about 2.5 times the average particle diameter and preferably from about 1.25 to about 1.75 time the average particle diameter. Preferably, the valve exit gap can be smaller at the outer perimeter than at a point radially inward on the resilient screening insert, for a valve apparatus including a mechanical means for positioning the valve closure member relative to the valve seat member.

FIGS. 9–13 illustrate an embodiment of the present invention to screen particles by utilizing the working mechanism of fluid flowing in the reverse direction. In FIGS. 9–13, only the right hand side of the valve apparatus cross sections are shown. With typical current valve assembly designs and typical valve lags, only a small volume of reverse screened flow occurs, and that small volume cannot displace the particle-laden fluid from the gap between the frustoconical contact surfaces. In contrast, embodiments of the present invention can act to increase valve lag and to maintain the screening gap until enough filtered fluid passes through the valve in reverse flow to displace the particle laden fluid from the gap between the frustoconical contact surfaces 24 and 32.

Figure 9:
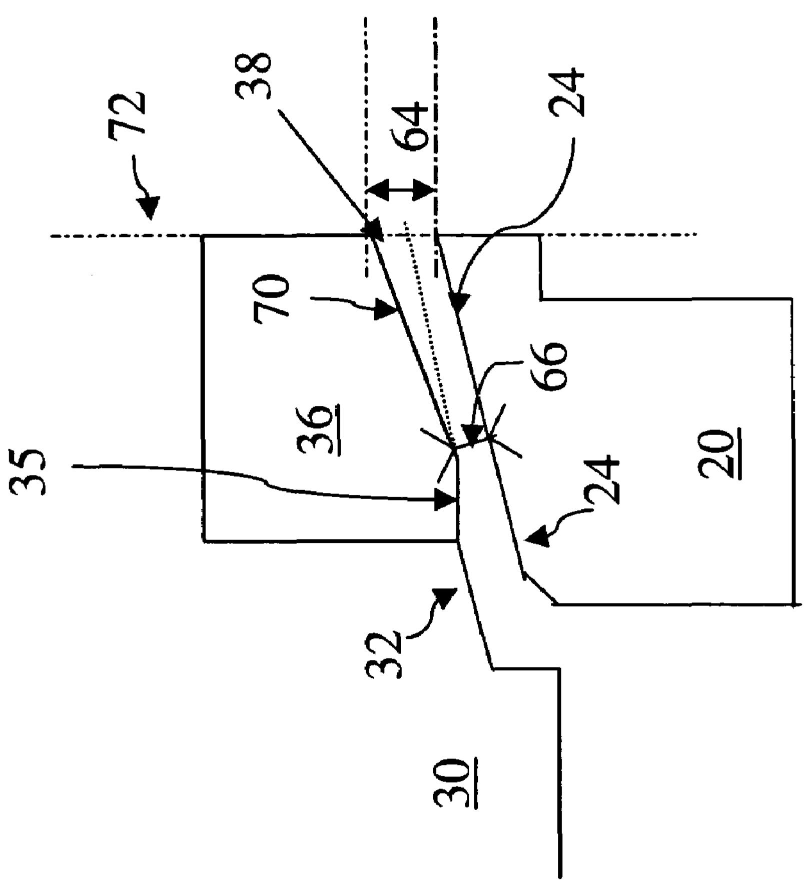

FIG. 9 depicts an embodiment of the present invention wherein the resilient insert 36 comprises a first insert contact surface 35 that forms the portion of the contact surface that is nearer to the longitudinal axis of the valve, and a second insert contact surface 70 further away from the longitudinal axis of the valve that is sloped such that the valve exit gap 38 between the second insert contact surface 70 and the valve seat member frustoconical contact surface 24 varies with the distance from the valve closure member outer perimeter 72, and is smallest at the juncture of the first insert contact surface and the second insert contact surface. The resilient insert does not extend into the valve exit gap at the point at which the resilient insert and the valve seat member frustoconical surface meet. The sloped second insert contact surface 70 allows for the reverse screening of particles through the valve exit gap 38 at the start of the plunger suction stroke, when there exists a reverse fluid flow from the discharge chamber 16 into the intake chamber 14 (chambers 14 and 16 are shown in FIGS. 1 and 19). Therefore the final amount of fluid passing in a reverse direction between the valve closure member contact surface 32 and the valve seat member 20 prior to the closure of the valve will be fluid that has had the particles screened out. The particle-free fluid will displace the particle-laden fluid that is located between the contact surface 32 and the contact surface 24. This will reduce the quantity of particles that are present between the contact surface 32 of the valve closure member 30 and the valve seat member 20 upon valve closure and reduce the damage to the frustoconical contacting surfaces 32 and 24 and also to the resilient insert 36. The particles to be screened out will consist of proppant particles having a generalized average diameter of about 0.01–0.10 inches and a likely average diameter of 0.02–0.07 inches. As shown in this illustration the outer valve exit gap 64 is larger than the inner valve exit gap 66. Upon reverse fluid flow, particles will be able to enter the outer valve exit gap 64 but not pass through the inner valve exit gap 66. Therefore particles can be trapped between the insert 36 and the valve seat member 20. Particles trapped between the insert 36 and the valve seat member 20 can hold the valve open until sufficient differential pressure exists across the valve to deform the resilient insert 36 and close the valve. Before the valve closes, the fluid which flows into the region between the valve closure member contact surface 32 and the valve seat member 20 can be screened by the proppant trapped between the insert 36 and the valve seat 20. This particle-free fluid can displace particle-laden fluid from the region between the frustoconical contact surfaces 24 and 32.

Figure 10:
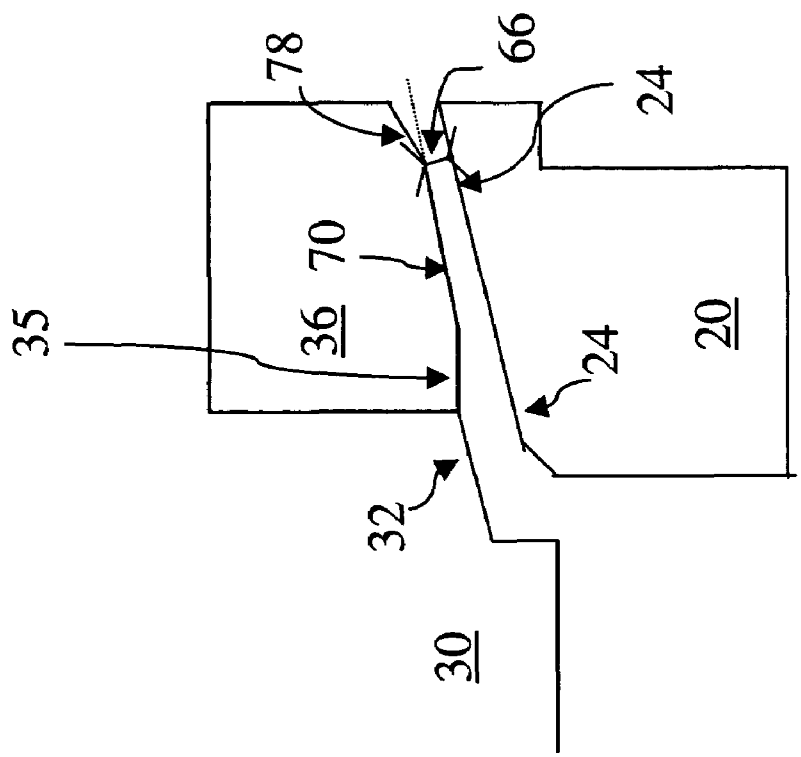
FIGS. 9–13 illustrate embodiments of the working mechanism of the present invention to screen particles from fluid flowing in the reverse direction.

FIG. 10 shows an embodiment where a portion of the second insert contact surface 70 is a sloped third insert contact surface 78 which is at the outer perimeter of the resilient insert 36. This embodiment traps particles between the sloped third insert contact surface 78 and the outer perimeter of the valve seat member frustoconical contact surface 24 during reverse flow when the valve body 30 nears the valve seat 20. The trapped particles hold the valve open until sufficient differential pressure exists across the valve to deform the insert material 36 to effect a seal against the contact surface 24. When the valve closes, particles are kept away from the contact surface 32 and from the first insert contact surface 35 and that portion of the second insert contact surface 70 that is inward from the inner perimeter of the sloped third insert contact surface 78. This embodiment is preferable to the embodiment shown in FIG. 9, in that a larger portion of the insert 36 is kept free of trapped proppant. Less percentage distortion of the insert material is required to effect a seal to the valve seat member contact surface 24, and there is less proppant damage to the critical interface between the valve closure member contact surface 32 and the resilient insert 36.

Figure 11:
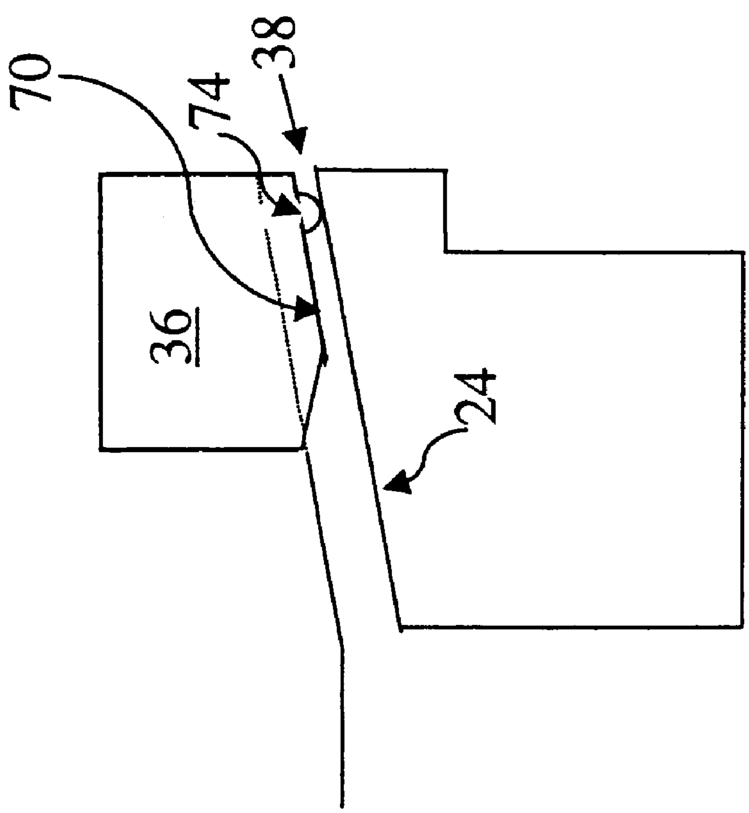

FIG. 11 illustrates an embodiment of the present invention wherein the resilient insert 36 comprises at least one protrusion 74 arising from the contact surface 70. These protrusions 74 act to hold the contact surface 70 up off the contact surface 24 in a reverse screening position, until sufficient pressure differential exists to distort the protrusions and allow the contact surface 70 to reach the contact surface 24. The protrusions can be of resilient material. Before the protrusions become distorted, the gap 38 is small enough to screen particles from the reverse flow fluid. The protrusions could also be a non-resilient material; in this case, the deformation would be within the resilient insert 36.

Figure 12:
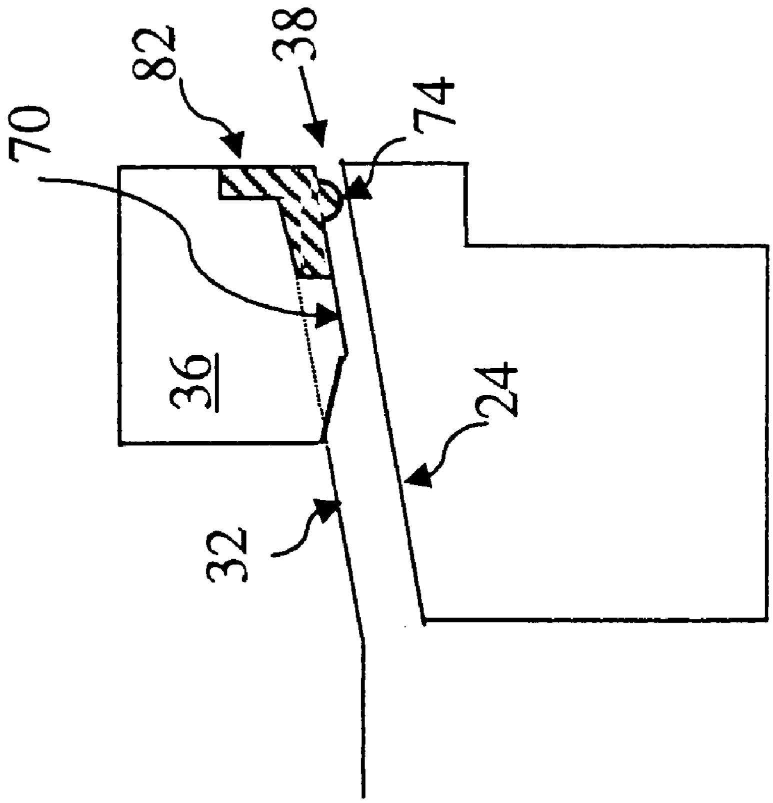

FIG. 12 illustrates an alternative embodiment of the present invention wherein the resilient insert 36 comprises a non-resilient element 82 that contains at least one protrusion 74 arising from the contact surface 70. These protrusions 74 act to hold the contact surface 32 above the contact surface 24 in a reverse screening position. The reverse flow entrance gap 38 is small enough to screen particles. The gap between the contact surface 32 and contact surface 24 initially is wide enough for particle laden fluid to pass, so that fluid with no particles can replace the particle laden fluid in said gap. When sufficient differential pressure exists, the insert 36 is deformed, and its contact surface 70 reaches the contact surface 24. The non-resilient element 82 can have properties that resist deformation and therefore retain its shape for an extended length of time.

Figure 13:
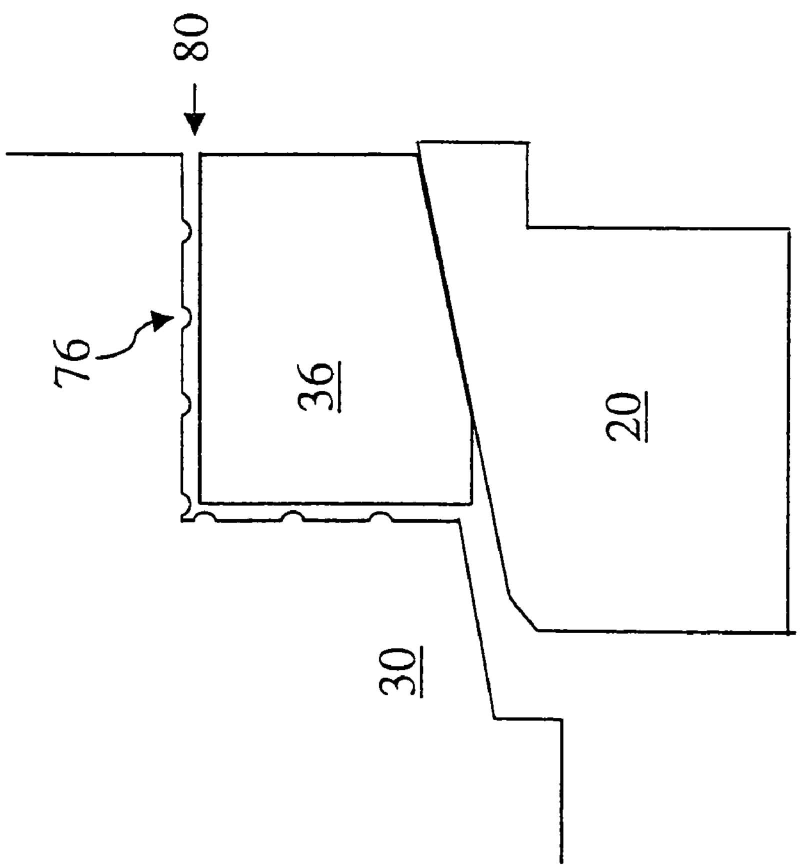

FIG. 13 depicts an embodiment of the present invention wherein a bypass fluid flow path 80 exists between the valve closure member 30 and the resilient insert 36 such that fluid may pass through the bypass fluid flow path 80 but particles of a selected size are screened out. As illustrated in FIG. 13, the bypass fluid flow path 80 can be established by protrusions 76 on the valve closure member 30 that keep the inset 36 spaced away from the valve closure member 30. There are other means to create a bypass fluid flow path other than those disclosed herein (e.g., protrusions could be located on the resilient insert 36). The bypass fluid flow path 80 allows for reverse fluid flow at the start of the plunger suction stroke that will wash out or alternatively more evenly distribute particle build up between the valve seat member 20 and the valve closure member 30. The bypass flow path 80 will be closed when sufficient differential pressure exists to force the valve closure member 30 down and deform the resilient insert 36 to close the valve.

Though they have been described as alternative embodiments, the embodiments of FIGS. 19 and 9 to 13 can actually be combined.

Figure 14:
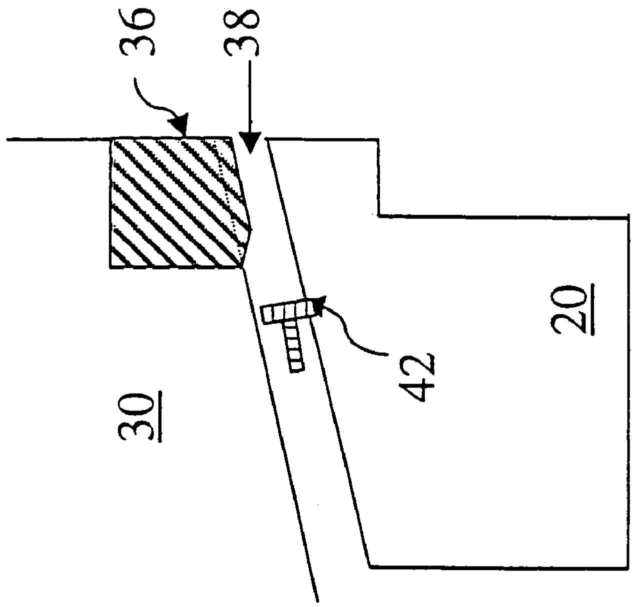
FIG. 14 illustrates the problem of foreign objects becoming lodged within the valve assembly.

FIG. 14 illustrates a common problem that can occur within pump valve assemblies. Only the right hand side of the valve apparatus cross section is shown. Foreign objects 42 (such as bolts, nuts, rocks, etc.) can become lodged between the valve seat member 20 and the valve closure member 30 and prevent the closure of the valve assembly.

Without an adequate closure of the valve assembly the pump will not perform correctly, which can lead to premature failure or necessitate unplanned repair work. This is particularly a problem when the foreign object is small enough to enter the space between the valve seat member 20 and the valve closure member 30 but is too large to pass through the valve exit gap 38.

FIGS. 15–18 illustrate embodiments of the present invention to screen foreign objects from fluid flowing through the valve apparatus.

Figure 15:
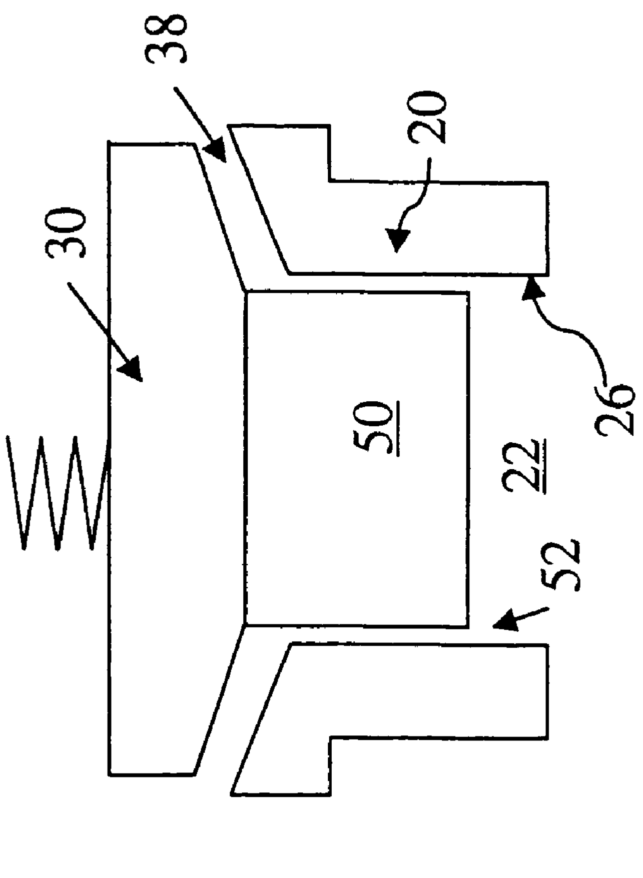

Referring to FIG. 15, there is shown an embodiment of a valve apparatus in accordance with the present invention. The valve closure member 30 has a cylindrical plug 50 that projects into the valve seat member bore 22 such that a plug gap 52 exists between the cylindrical plug 50 and the valve seat member cylindrical inner wall 26. This plug gap 52 will prevent foreign objects that are larger than the plug gap 52 from passing into the valve assembly. These foreign objects will be contained below the valve closure member 30 where they cannot become lodged between the valve closure member 30 and the valve seat member 20. If the maximum valve exit gap 38 is larger than the plug gap 52, any objects that pass through the plug gap 52 should be able to pass through the valve assembly without becoming lodged. Preferably the plug gap 52 is from about 0.10–0.30 inches. It is preferred that the cylindrical plug 50 extend below the cylindrical inner wall 26.

FIG. 15 uses a cylindrical plug to illustrate the use of a plug gap 52 to screen foreign objects from the fluid and prevent them from entering the valve apparatus. The plugs used for foreign object screening need not be entirely cylindrical. In FIG. 15 the plug would not protrude through the bottom of the valve seat member bore even when the valve is closed. For such a valve apparatus, the foreign object screening plug only needs to have a circular cross section at the bottom to define the plug gap 52 between the plug and the valve seat cylindrical wall 26 which excludes foreign objects larger that the plug gap 52 from entering the valve apparatus. Plug shapes other than cylindrical may be used, if they have the circular bottom cross section.

Figure 16:
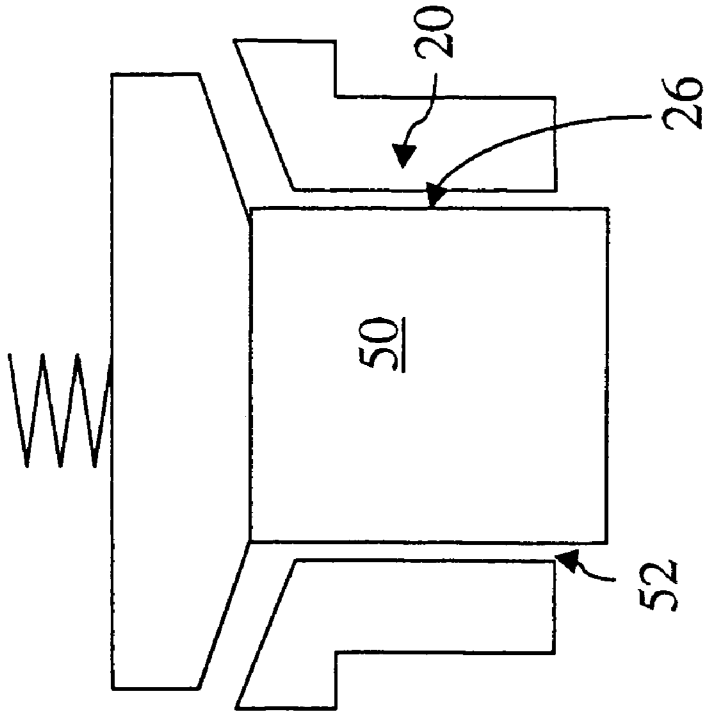
FIGS. 15–18 illustrate embodiments of the working mechanism of the present invention to screen foreign objects from fluid flowing through the valve apparatus.

FIG. 16 shows an alternate embodiment of the present invention wherein a cylindrical plug 50 extends all the way through the valve seat member bore. This embodiment would restrict foreign objects from entering the valve seat member bore and contain them within the intake chamber 14 (as shown in FIG. 19). The plug need not be entirely cylindrical to maintain the plug gap 52 between the plug and the valve seat cylindrical wall 26. Only that portion of the plug which protrudes below the bottom of the valve seat 20 when the valve is fully closed needs to be cylindrical. Other shapes are acceptable for the portion of the plug above the cylindrical portion.

Figure 18:
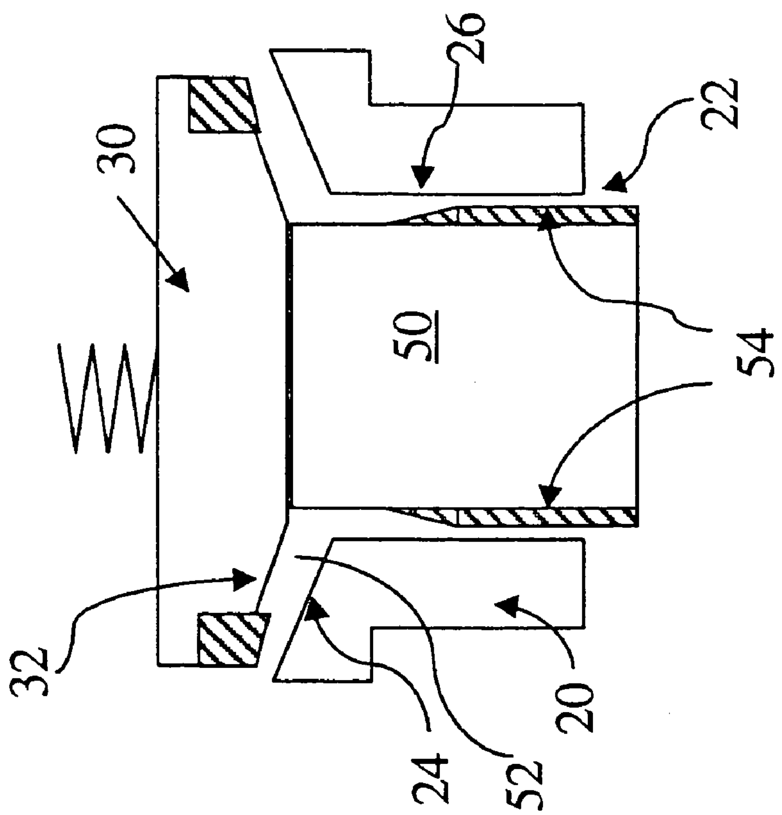
Figure 17:
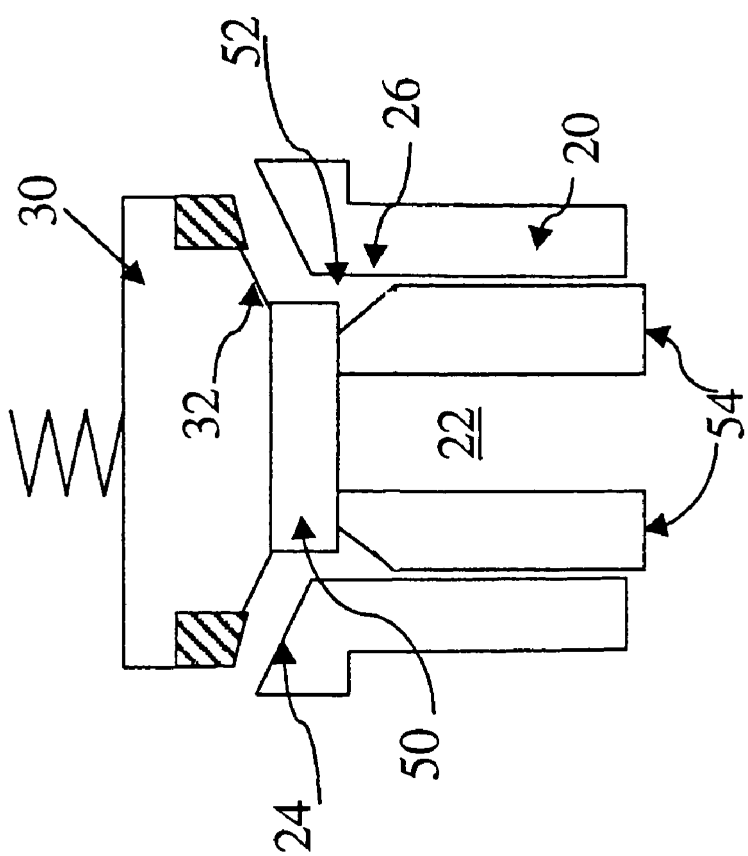

Referring to FIGS. 17–18, where the reference numbers have the same meaning as in the preceding figures, radial protrusions 54 extending from the cylindrical plug 50 can be used to align the cylindrical plug 50 relative to the valve seat member wall 26 to substantially equalize the plug gap 52 around the circumference of the cylindrical plug 50. A substantially equalized plug gap would preferably have a <150% variance in size from the narrowest gap to the largest gap, more preferably <75% variance and most preferably <20% variance. The radial protrusions 54 can optionally extend below the cylindrical plug 50 into the valve seat member bore 22 and can extend through the valve seat member bore 22.

The elements of the valve assembly can be made from a variety of materials depending on design factors such as the type of fluid to be pumped and the pressure rating that is needed. The pump body portion 12 and the valve seat member 20 are usually made of metal. The valve closure member 30 is usually made of metal but could also be made from composites or other durable materials in an effort to control the weight and balance of the valve closure member 30. The frustoconical contact surfaces 24 and 32 are typically made from a durable metal, while the resilient insert 36 is usually made from an elastomeric material such as polyurethane. The screening members could also be made from such a resilient material. Those screening members which do not contact either opposing frustoconical contact surface could be made of metal or of resilient material.

The preceding description of specific embodiments of the present invention is not intended to be a complete list of every possible embodiment of the invention. Persons skilled in this field will recognize that modifications can be made to the specific embodiments described here that would be within the scope of the present invention.

The embodiments for forward flow screening, reverse flow screening and foreign object screening can be combined.

What is claimed is:

1. A valve apparatus having a longitudinal axis therethrough, comprising:

i) a valve seat member that comprises a hollow bore and a first frustoconical contact surface;

ii) a valve closure member that comprises a body and a second frustoconical contact surface that is adapted to seal against the first frustoconical contact surface, the valve closure member being movable along the longitudinal axis of the valve apparatus;

iii) a fluid flow path through the bore of the valve seat member and between the valve seat member and the valve closure member, the fluid flow path being closed when the second frustoconical contact surface is in contact with the first frustoconical contact surface; and iv) a reverse screening member that is attached to at least one of the valve closure member or the valve seat member and that screens particles from fluid passing through the fluid flow path in a reverse direction when the valve closure member approaches the valve seat member; and v) a means to delay the valve closure while the reverse screening member is within a range of screening distances from the opposing frustoconical contact surface wherein the means to delay valve closure is a resilient screening insert which allows the passage of screened fluid until differential pressure across the valve deforms the insert to seal the valve, further wherein the resilient screening insert comprises at least one protrusion from its contacting surface, and the one or more protrusions create a screening gap between the insert and the opposing frustoconical contacting surface when the valve closure member approaches the valve seat member, and further wherein the one or more protrusions are of resilient material and deform under forces caused by differential pressure to allow the screening gap to close.

2. The valve apparatus of claim 1, wherein the one or more protrusions and the resilient screening insert are formed from a single piece of resilient material.

3. The valve apparatus of claim 1, wherein the one or more protrusions and the resilient screening insert are formed from separate pieces of the same resilient material.

* * * * *